C. ZOCHER.
Cotton-Cultivators.
No. 139,750.          Patented June 10, 1873.
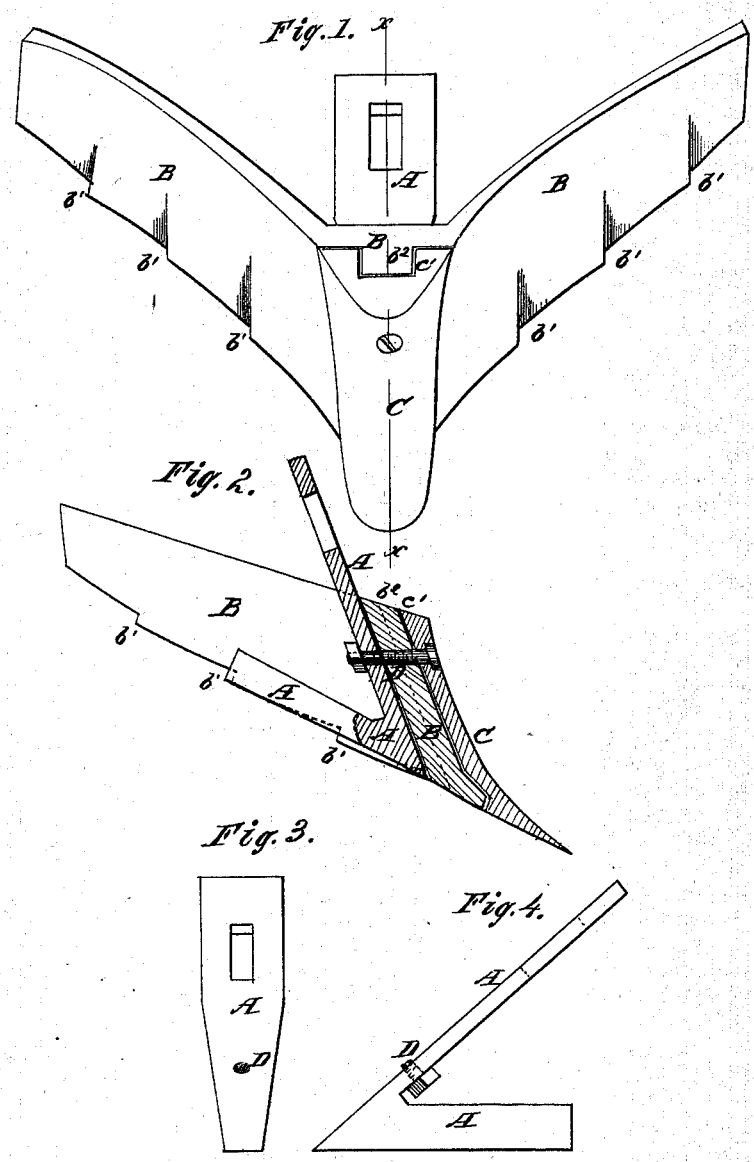
Witnesses:
Inventor:

UNITED STATES PATENT OFFICE.

CHARLES ZOCHER, OF AUGUSTA, GEORGIA.

IMPROVEMENT IN COTTON-CULTIVATORS.

Specification forming part of Letters Patent No. 139,750, dated June 10, 1873; application filed March 29, 1873.

*To all whom it may concern:*

Be it known that I, CHARLES ZOCHER, of Augusta, in the county of Richmond and State of Georgia, have invented a new and useful Improvement in Sweep, of which the following is a specification:

Figure 1 is a front perspective view of my improved sweep. Fig. 2 is a detail vertical longitudinal section of the same taken through the line $x\ x$, Fig. 1. Fig. 3 is a front view of the shoe or foot. Fig. 4 is a side view of the same.

Similar letters of reference indicate corresponding parts.

My invention has for its object to furnish an improved sweep for cultivating cotton and other crops, and which shall be so constructed as to prevent the grass and weeds from clogging the sweep or throwing it out of the ground, which will quickly discharge the soil collected before it from the ends of the wings.

The improvement relates to the peculiar form or arrangement of notches, shoulders, or offsets in the cutting-edge of the sweep, as hereinafter described.

A is the foot or shoe, the upper arm of which is secured to the standard of the stock, and its lower arm is designed to rest upon the ground, and thus give steadiness to the sweep when at work. B are the wings of the sweep, which are made solid in one piece, and the middle part of which fits upon and is bolted to the forward side of the lower part of the foot A. The wings B project and slightly curve rearward and outward, and the lower parts of their forward sides are made with offsets $b^1$, as shown in Figs. 1 and 2, which break up their edges, and thus cause them to readily discharge the grass or weeds that may collect upon said edges. Each offset is formed by cutting away the edge of the sweep both upward and backward, while the portion of the edge between the offsets slopes, or is so inclined to the line of draft that the soil or other substance with which it may come in contact will readily escape or be turned off. It is thus an improvement on the "plow-share" of L. M. Reed, patented in 1869, No. 85,533.

C is the point, upon the rear side of which is formed a groove, $C'$, to receive a tongue, $b^2$, formed upon the forward side of the middle part of the wings B, shown in Fig. 1, so as to keep the said point in position. The three parts A B C are secured to each other by a bolt, D, as shown in Figs. 1 and 2.

By this construction the parts of the sweep may be detached when dull and ground upon an ordinary grindstone, it being unnecessary to take the sweep to a blacksmith-shop to be sharpened.

Having thus described my invention, I claim as new and desire to secure by Letters Patent—

The sweep B, having its cutting-edge notched and the portion of said edge between the offsets $b^1$ inclined, as specified, for the purpose of enabling the sweep to clear itself of obstructions, as set forth.

CHARLES ZOCHER.

Witnesses:
JOHN Q. HEATH,
W. MILO OLIN.